CHARACTER RECOGNITION APPARATUS

Filed July 19, 1962 2 Sheets-Sheet 1

INVENTOR.
PIER GIORGIO PEROTTO
BY
Kenyon & Kenyon
ATTORNEYS

INVENTOR.
PIER GIORGIO PEROTTO
BY
Kenyon & Kenyon
ATTORNEYS

United States Patent Office

3,188,611
Patented June 8, 1965

3,188,611
CHARACTER RECOGNITION APPARATUS

Pier Giorgio Perotto, Turin, Italy, assignor to Ing. C. Olivetti & C., S.p.A., Ivrea, Italy, a corporation of Italy Filed July 19, 1962, Ser. No. 210,937
Claims priority, application Italy, July 25, 1961, 14,134/61
4 Claims. (Cl. 340—146.3)

The present invention relates to an apparatus for the automatic recognition of printed characters.

More particularly, the invention relates to a recognition apparatus wherein each character is scanned for producing a character signal having a wave shape characteristic of said character, said character signal being sampled at different time points for producing a plurality of samples which are analyzed to identify said character.

An object of this invention is to provide an apparatus of the aforesaid type, which is adapted to recognize also imperfectly printed characters.

A further object of this invention is to provide a recognition apparatus using highly efficient recognition criteria with a minimum of electronic components.

A further object of the invention is to provide a recognition apparatus wherein the character signal is sampled without using costly delay-lines, as in the previous apparatus, and wherein a greater sampling accuracy is achieved.

Other objects and features of the invention will become apparent from the following description of a preferred embodiment thereof, with reference to the accompanying drawings, wherein:

FIGS. *1a* and *1b* show a block diagram of the character recognition apparatus according to the invention;

Figure 1A:
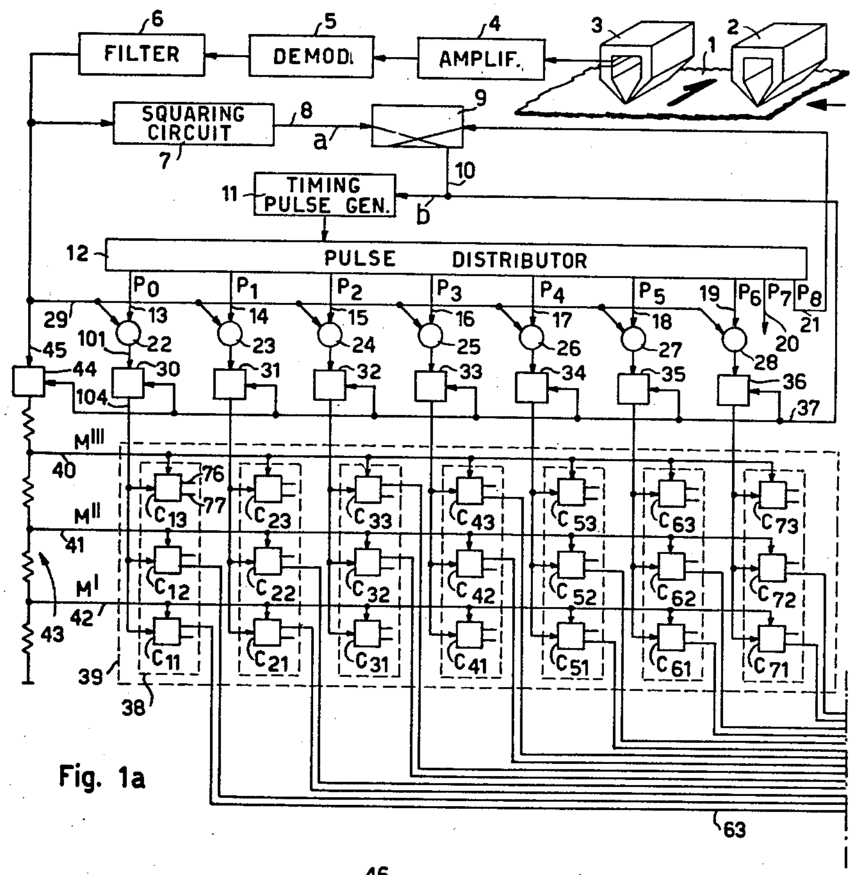

The characters, which are printed with magnetizable ink on a paper sheet 1, are first magnetized by a magnetizing head 2 energized by an alternate current having a frequency of 6 kHz., for instance, and thereafter scanned by a reading head 3 under which the sheet 1 is moved in the direction shown by the arrow. The head 3 is provided with an air gap having in the direction perpendicular to the direction of the paper sheet movement such a size as to cover completely the character.

Therefore, when scanning a character the magnetic head 3 produces a 6 kHz. signal, whose amplitude is modulated according to the character shape. Said signal is sequentially fed to an amplifier 4, a demodulator 5 and a low pass filter 6, so as to obtain at the output of said filter a signal having a wave shape characteristic of the scanned character, which signal will hereinafter be referred to as a character signal.

The character signal is fed to a squaring circuit 7 which is adapted to produce on its output 8 a square signal *a* (FIG. 2) as long as the amplitude of the character signal is higher than a predetermined threshold level.

The leading edge of the signal *a*, which by properly predetermining said threshold level may be caused to substantially coincide with the beginning of the character signal, sets a flip-flop 9 so as to energize its output 10.

The output 10, when energized, starts a timing pulse generator 11, which is thereafter operative during a time interval *b* (FIG. 2), whose duration is predetermined to be equal to the maximum possible duration of any character signal, whereupon the generator automatically stops.

More particularly, the pulse generator 11 causes a plurality of outputs 13 to 21 of a pulse distributor 12 to be energized in sequence, so as to produce on each one of said outputs a signal $P_0$ to $P_8$, respectively. The outputs 13 to 19 are connected to a plurality of transmission gates 22 to 28, respectively. The signals $P_0$ to $P_6$ sequentially open for a short time, hereinafter referred to as time point, the transmission gates 22 to 28, respectively; the signal $P_7$ is a timing signal; the signal $P_8$ is used to reset the flip-flop 9, so as to deenergize its output 10 for stopping the generator 11.

The transmission gates 22 to 28 receive the character signal through a common input line 29, whereby on the output of each one of said gates a signal is obtained which will be referred to hereinafter as a sample and whose amplitude is equal to the instantaneous amplitude of the character signal at the time point at which the gate was opened.

Said samples are stored in a plurality of analog storage elements 30 to 36, which are connected to the transmission gates 22 to 28, respectively, which will be described later and which are adapted to be cancelled at the end of the time interval *b* by a signal fed to a common line 37.

The sample stored in each storage element is fed to a separate analog-to-digital converter 38 of a plurality of converters included in a converting device 39 common to all the characters.

Each converter 38 is adapted to provide a multidenominational binary representation of the sample supplied thereto.

More particularly, each converter 38 is made of a comparing device including three binary denominations, each denomination comprising a comparator $C_{11}$, $C_{12}$, $C_{13}$, respectively. Each comparator, which is provided with a pair of complementary binary outputs, namely a direct output 76 and an inverse output 77, is adapted to compare the sample supplied thereto with a reference amplitude proper to its denomination, so as to produce on its direct output a binary signal having either the value "1" or "0" depending as to whether said sample is higher than said reference amplitude or not. Therefore, the direct outputs of the comparators $C_{11}$, $C_{12}$ and $C_{13}$ provide a three-bit digital representation of the sample stored in the corresponding storage element 30.

The comparators of the group of converters 39 are operatively arranged in a bidimensional matrix, the comparators of each column being fed with a sample and the comparators of each row being fed, through a common line 40, 41 and 42, respectively, with the aforesaid reference amplitude.

More particularly, said lines 40, 41 and 42 are connected to corresponding different tapping points of a resistive voltage divider 43, which is fed by a storage element 44 structurally equal to the storage elements 30 to 36 and adapted to store the maximum amplitude of the wave shape of the character signal fed to an input 45.

Therefore the lines 40, 41 and 42 are fed with reference voltages M''', M'' and M', respectively, whose amplitude is proportional to three different fractions of the maximum amplitude of the character signal.

It is thus apparent that, in order to convert to the digital form the samples stored in the analog storage elements 30 to 36, the comparators of the converting device 39 compare said samples with three different fractions of the maximum amplitude of the character signal, whereby the recognizing apparatus is made sensitive only to the wave shape of the character signal, irrespective of the amplitude variations which may occur among characters having the same significance.

The comparators of the converting device 39 feed a different decoder for each one of the characters to be recognized. To understand the structure of the decoder, the character "1" will now be considered. Assuming the corresponding character signal has the wave shape indicated by the numeral 46 in FIG. 2, wherein the horizontal lines indicate the three reference amplitude levels M', M'' and M''' obtained from the voltage divider 43 and the vertical lines 47 to 53 indicate the time points at which the seven samples of the character signal are picked up, after having scanned said character the direct outputs of the converting device 39 assumes the binary values represented by the following table:

| | | | | | | |
|---|---|---|---|---|---|---|
| $C_{13}=0$ | $C_{23}=0$ | $C_{33}=1$ | $C_{43}=0$ | $C_{53}=0$ | $C_{63}=0$ | $C_{73}=0$ |
| $C_{12}=0$ | $C_{22}=0$ | $C_{32}=1$ | $C_{42}=1$ | $C_{52}=0$ | $C_{62}=0$ | $C_{72}=0$ |
| $C_{11}=1$ | $C_{21}=1$ | $C_{31}=1$ | $C_{41}=1$ | $C_{51}=0$ | $C_{61}=0$ | $C_{71}=0$ |

In this table the bits of each column 001, 001, 111, 011, 000, 000 and 000, respectively, provide a digital representation of the sample corresponding to said column, whereby the table provides a pattern of binary signals distinctive of said character.

The shape of the printed characters is such that any character having a different significance would produce a different pattern of signals, that is a different table.

However, to identify a character not all the bits of the corresponding table must necessarily be considered. The complete representation of the amplitude of the fourth sample pertaining to the abscissa 50 of FIG. 2 comprises for example the three bits $C_{41}=1$, $C_{42}=1$, $C_{43}=0$, of which the two bits $C_{43}$ and $C_{42}$, which indicates that the sample is lower than M''' and higher than M'', respectively, are sufficient to define the amplitude of said sample, while the bit $C_{43}$, which indicates that the sample is also higher than M', is obviously redundant.

Figure 2:
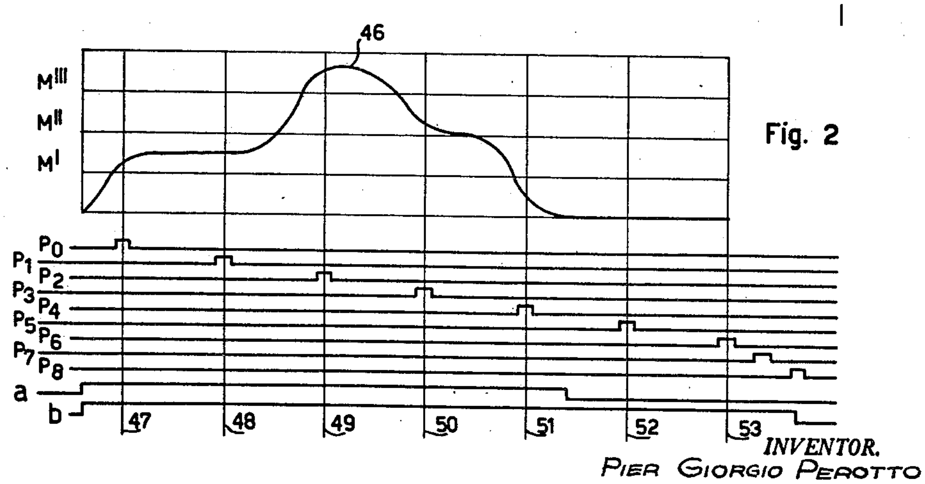
FIG. 2 shows the time diagram of some signals appearing in the apparatus.

Therefore, the character of FIG. 2, when considering its ideal form, may be identified by the following pattern of bits:

$$C_{11}=1,\ C_{12}=0,\ C_{21}=1,\ C_{22}=0,\ C_{32}=1,\ C_{33}=1,\ C_{42}=1$$
$$C_{43}=0,\ C_{51}=0,\ C_{52}=0,\ C_{61}=0,\ C_{62}=0,\ C_{71}=0,\ C_{72}=0$$

In other words, and considering also the inverse outputs of the comparators, said character is identified by the simultaneous presence of a binary signal "1" on the following outputs: $C_{11}$, $\underline{C_{12}}$, $C_{21}$, $\underline{C_{22}}$, $C_{32}$, $C_{33}$, $C_{42}$, $\underline{C_{43}}$, $\underline{C_{51}}$, $\underline{C_{52}}$, $\underline{C_{61}}$, $\underline{C_{62}}$, $\underline{C_{71}}$, $\underline{C_{72}}$, wherein the underscored symbols indicate inverse outputs.

Any other character may likewise be identified, in its ideal form, by the simultaneous energization of a different group of outputs among the 42 outputs of the converting device 39, said group comprising a number $n$ of outputs which is not necessarily equal for all the characters.

Therefore, it is clear that a decoder for a character having a certain significance may be of a first type 54 (FIG. 1*b*) comprising a coincidence circuit 55, having $n$ inputs, that is as many inputs 56 as are the bits of the pattern distinctive of said character significance, for instance fourteen inputs in the preceding example, said inputs being fed by those outputs of the converting device 39, whose simultaneous energization identifies said character.

If the characters to be recognized are N, the recognizing apparatus comprises N such decoders, each one connected through an individual group of $n$ lines 63 to the corresponding $n$ outputs of the converting device 39.

When scanning a character, all the inputs of the corresponding decoder are coincidentally energized, whereby on the output 57 (FIG. 2) a signal is obtained, which at the end of the time interval *b*, as the timing signal $P_7$ opens a gate 58, is transferred to the output 59 to signal that said character has been identified. In the meantime no signal is obtained on the outputs of the other decoders.

Each decoder for a character having a certain significance may also be of a second type 60, comprising an analog adder 61, for instance of the type described in the pages 484 and 485 of the book "Digital Computer Components and Circuits" of R. K. Richards, 1957, said adder having $n$ inputs 62 connected to those $n$ outputs of the converting device 39, whose simultaneous energization identifies said character.

Figure 1B:
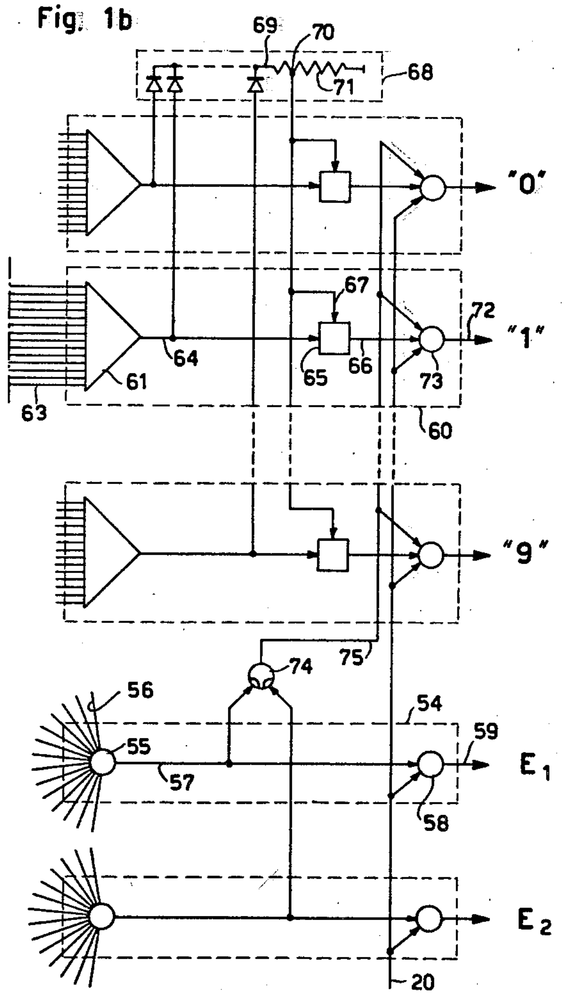

For simplicity in FIG. 1 only those lines 63 are shown, which connect the converting device 39 to the decoder 60 corresponding to the character "1." On the output 64 the analog sum of the binary signals fed to said inputs is obtained. The output 64 feeds a comparator 65 adapted to provide a signal on its output 66 only when the voltage at the input 64 is higher than the voltage at the input 67. The input 67 of the comparator 65 is connected to the output of an "or" gate 68, which is fed by the outputs of all the analog adders corresponding to the various characters to be recognized. It is known that such a gate is adapted to provide on a terminal 69 a signal whose amplitude is equal to the maximum amplitude of the signals fed to its inputs. In the present case, the output signal of the "or" gate, which is obtained from a tapping point 70 of a resistance 71, is slightly lower than said maximum. Therefore, at the output of the comparator 65 a signal will be obtained only if the sum computed by the analog adder 61 is the greatest one of the sums computed by all the analog adders.

Said signal is transferred to an output 72 to indicate that the corresponding character has been recognized, when the timing signal $P_7$ opens a gate 73.

In the present embodiment two decoders 54 of the first type are used to recognize two special characters $E_1$ and $E_2$, respectively, while ten decoders 60 of the second type are used to recognize the ten decimal digits "0" to "9."

The opening of the gates 73 is conditioned by the energization of the output of an inhibiting gate 74 fed by all the outputs 57 of the gates 55 and adapted to energize the output 75 only if none of the outputs 57 is energized, whereby the outputs of the converters 60 can be energized only if all the outputs 57 are deenergized.

The mode of operation of the apparatus when scanning the character of FIG. 2 will now be described.

At the beginning the storage elements 30 to 36 are clear; the generator 11 is inoperative, whereby the gates 22 to 28 are closed. Moreover, the output gates 58 and 73 of the decoder 54 and 60, respectively, are closed, because the output 20 of the pulse distributor 12 is not energized.

Assuming the paper sheet 1 is moving in the direction indicated by the arrow, the first character of the sheet, which is a "1" in FIG. 1, is first magnetized by the magnetic head 2 and then scanned by the magnetic head 3, from which a signal is obtained, which after having been amplified, demodulated and filtered, produces on the output 45 a character signal having for instance the wave form indicated by the reference numeral 46 in FIG. 2. At the beginning of said character signal, which corresponds to the time point wherein the reading head 3 begins to scan the edge of the printed character, the voltage *a* (FIG. 2) on the output 8 of the squaring circuit 7 is raised to switch the flip-flop 9, whereby the voltage *b* on the output 10 of said flip-flop is raised to the energized level. Therefore, the pulse generator 11 is made operative and the storage elements 30 to 36 are conditioned to receive the samples of the character signal.

Thereafter a short pulse $P_0$ (FIG. 2) produced by the generator 12 is routed to the output 13 of the pulse distributor 12 to open for a short time interval the gate 22, whereby the actual amplitude of the wave shape 46 present on the input line 29 is stored in the first storage element 30 as the first sample of the character signal.

The pulse $P_0$ is followed by a second short pulse $P_1$ fed to the second output 14, which opens for a short time interval the gate 23, whereby the actual amplitude of the wave shape 46 present on the input line 29 is stored in the second storage element 31 as the second sample of the character signal and so on for the following pulses $P_2$, $P_3$, $P_4$, $P_5$ and $P_6$.

Therefore, at the end of the operation time of the generator 11 the seven samples of the character signal, as picked up at the seven time points, respectively, at which the gates 22 to 28 have been opened, are stored in the corresponding storage elements 30 to 36, respectively.

In the meantime the character signal is fed to the analog storage element 44, wherein the maximum amplitude of the signal itself is thus stored. Therefore, on the lines 40, 41 and 42 the reference amplitudes indicated by the symbols M''', M'' and M' in FIG. 2 are obtained, whereby the direct outputs of the comparators of the converting device 39 are finally as shown in the preceding table.

Therefore, at the end of the character scanning time no decoder 54 has its output 57 energized, whereby the output 75 of the gate 74 is energized to allow the gates 73 of the decoders 60 to be opened.

Among said decoders 60, only the decoder which corresponds to the digits "1" receives *n* binary "ones" on the *n* inputs of the analog adder 61, while the total number of binary "ones" entered into the other analog adders is certainly lower.

Therefore, the adder 61 corresponding to the scanned character has provided the maximum output, whereby only the comparator 65 corresponding to said character provides a signal, which at the timing signal $P_7$ is transferred to the output 72 to signal that said character has been identified.

Every character would be suitably recognized by a decoder of the first type, when printed in its ideal form.

On the other hand the decoders of the second type allow also imperfectly printed characters to be recognized and in the present embodiment they are used for recognizing numerals, which are more affected by said imperfections.

In the present apparatus the variations in the samples obtained from characters having a certain significance do not affect the recognition process, provided they do not produce a variation in the corresponding digital representation obtained from the converting device 39. Therefore, tolerances may be allowed for the form of the printed character.

Moreover, said variation may be tolerated even if they affect said digital representation, provided the output of the adder 61 which corresponds to said character remains greater than the output of the other adders.

Figure 3:
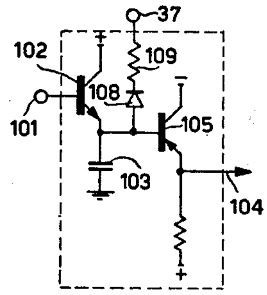
FIG. 3 shows the circuit details of an analog storage element embodied in the apparatus.

FIG. 3 shows one of the storage elements 30 to 36. The sample to be stored is fed to the base terminal 101 of a transistor 102 acting as an emitter-follower to charge a storage condenser 103, which thereafter remains charged during a time sufficiently long for the recognition of the character. The sample stored in the condenser 103 is transferred to the output 104 of the storage element through an emitter-follower 105.

A reset signal having an amplitude of −20 v. may be fed to the terminal 37 of the storage element. When said signal is present the emitter current of the transistor 102 flows through diode 108 and resistor 109, whereby the condenser 103 is kept discharged. On the contrary, when the terminal 37 is kept at a +10 v. voltage level, that is during the operation of the pulse generator 11, the diode 108 is blocked, whereby the condenser 103 is allowed to store a charge representing the sample fed to the input 101.

It is intended that many changes, additions of parts and improvements may be made to the above described apparatus without departing from the scope thereof.

What I claim is:

1. Apparatus for recognizing printed characters, comprising in combination:
- means for sequentially scanning said characters,
- means fed by said scanning means for producing for each one of said characters a signal having a wave shape characteristic of said character,
- a plurality of analog amplitude storage elements,
- a plurality of normally closed transmission gates each one connecting said signal producing means to one of said storage elements,
- timing means responsive to the beginning of each one of said produced signals for defining a plurality of sequential sampling time points,
- means responsive to said timing means for sequentially opening said gates at said time points, whereby a sample of the instantaneous amplitude of said signal is stored in each one of said storage elements,
- and means fed by said storage elements for producing a binary coded signal pattern representative of said character.

2. Apparatus for recognizing printed characters, comprising in combination:
- means for sequentially scanning said characters,
- means fed by said scanning means for producing for each one of said characters a signal having a wave shape characteristic of said character,
- means for sampling different portions of said wave shape for simultaneously producing a plurality of samples each one representing the amplitude of one of said portions,
- means for establishing a plurality of reference amplitude levels,
- a plurality of comparators operatively arranged in a bidimensional matrix having a column of comparators for each one of said samples and a row of comparators for each one of said reference levels, each comparator being adapted to compare the corresponding sample with the corresponding reference level for producing a binary signal having a value depending upon the relative magnitude of said compared sample and level, whereby a pattern of binary signals distinctive of said character is obtained,
- and a different decoder for each one of said characters, said decoder being fed by the signals produced by a certain group of said comparators, which group is predetermined according to a pattern distinctive of said character.

3. Apparatus for recognizing printed characters, comprising in combination:
- means for sequentially scanning said characters,
- means fed by said scanning means for producing for each one of said characters a signal having a wave shape characteristic of said character,
- means for sampling different portions of said wave shape for producing a plurality of samples each one representing the amplitude of one of said portions,
- a single plurality of analog-to-digital converters, each one adapted to provide a multidenominational binary representation of one of said samples,
- a different coincidence circuit for each one of said characters, said coincidence circuit being fed by certain denominations of each converter which are predetermined according to a pattern distinctive of said character,
- and means fed by said coincidence circuits for identifying said characters.

4. Apparatus for recognizing printed characters, comprising in combination:
- means for sequentially scanning said characters,
- means fed by said scanning means for producing for each one of said characters a signal having a wave shape characteristic of said character, means for sampling different portions of said wave shape for producing a plurality of samples each one representing the amplitude of one of said portions, a single plurality of analog-to-digital converters, each one adapted to provide a multidenominational binary representation of one of said samples, a different analog adder for each one of said characters, said adder being fed by certain denominations of each converter which are predetermined according to a pattern distinctive of said character, and means responsive to the adder producing the maximum sum for identifying said character.

References Cited by the Examiner

UNITED STATES PATENTS 3,089,122 5/63 Seehof et al. ---------- 340—146.3

MALCOLM A. MORRISON, *Primary Examiner.*